Patented Aug. 24, 1948

2,448,000

UNITED STATES PATENT OFFICE 2,448,000

MANUFACTURE OF ALKALINE EARTH METALS

Frank R. Kemmer, Louisville, Ky., assignor to Reynolds Metals Company, a corporation of Delaware No Drawing. Application December 29, 1944, Serial No. 570,456

2 Claims. (Cl. 75—67)

1

This invention relates to making alkaline earth metals and particularly to the process of liberating these metals from their oxides by the use of aluminum as the reducing agent in conjunction with agents which improve the operation commercially.

Briefly stated, the invention comprises the method of making magnesium, calcium, barium, or strontium by thermal reduction of the oxide of the selected metal by means of aluminum metal and a moderating agent consisting of aluminum nitride and preferably of a mixture of the nitride with aluminum, carbide and oxide. In a modification, the invention comprises the use of ferrosilicon as an additional modifier of the reducing power of aluminum.

The invention is especially useful in connection with the manufacture of magnesium and will be first illustrated by detailed description in connection with such use.

The source of the magnesium and conditions of operation not specifically recited herein are those conventionally employed in the thermal reduction process for magnesium with ferrosilicon as the reducing agent. The source of magnesium, ordinarily magnesium oxide or a mixture of magnesium oxide with lime derived from calcination of dolomite, is mixed with the selected reducing agent, the charge is then heated to the temperature of reduction of at least and usually above 2,000° F. under a high vacuum, and magnesium so liberated is passed in elemental condition to a condenser chamber. Here the vapor is condensed in solid form on the walls of the chamber.

It is not necessary with my improved process to make any change in the design of the thermal reduction furnaces and condensers now in use, although it may be later found to be very desirable to increase the capacity of the condenser so as to accommodate the higher rate of magnesium distillation which my process makes possible as compared to the now extensively used process based on ferrosilicon as the reducing agent.

It is essential to the invention that the moderator mixture should be either free from any substantial proportion of alkali metal compounds or contain an amount of them not substantially in excess of 0.5 to 0.75 part, calculated as sodium oxide, for 100 parts of the whole reducing mixture including the aluminum metal.

For best results the several ingredients of the moderating mixture are used in about the following proportions: 10 to 50 parts of aluminum oxide and 0.5 to 10 parts of aluminum nitride and 0.1 to 1 part of aluminum carbide for 100 parts of total weight of the mixture with the aluminum metal.

There are important advantages from the use of moderators.

Using the reaction moderators referred to, I have found that the liberation of magnesium from magnesium oxide, either alone or in mixtures with incidental impurities such as the lime resulting from the calcination of dolomite, proceeds at a desirably uniform rate without overloading the capacity of the condensers during the first part of the generation of magnesium. At the same time, the reduction with the moderators present proceeds at a satisfactorily rapid rate until the batch is completed.

An advantage in my improved process is the reduction of temperature needed in the furnace to effect the release of magnesium vapor. This extends the life of the retorts, the scaling and collapse of which at the very high temperatures and under the vacuum used constitute a major cost in the conventional thermal reduction process for magnesium.

In one embodiment of the invention there is used, as the reducing mixture, the dross which is obtained in melting and subsequently casting aluminum or aluminum alloys, provided, however, that the dross selected must be about the proportion given above of nitride and preferably also of carbide and oxide to the aluminum and provided the content of alkali metal used is low. When the alkali metal content of the dross is above about 0.75% calculated as $Na_2O$, then alkali metal collects in the condenser in such quantity as to ignite and set fire to the magnesium in the condenser when, after the distillation is completed, the condenser is opened to the air. When a dross contains the proper proportions of moderators but is too high in alkali metal, the dross may be purified and made suitable for use by any suitable usual purification process for removal of sodium or the like.

In using ferrosilicon along with the aluminum compound or mixture of compounds, there may be used varying proportions of the ferrosilicon, as, for instance, 10 to 90 parts for 100 parts total weight of ferrosilicon and the moderating agents.

It will be recognized that some of the moderating agents serve the additional function of providing a reducing effect.

The compounds of aluminum that have been mentioned are particularly effective per unit of weight in moderating the reaction.

When the mixture of aluminum and moderators used is in the form of the dross obtained in the making of aluminum alloys which contain some magnesium, such dross will contain an appreciable proportion of metallic magnesium or magnesium compounds, oxide especially. When this dross is used with a charge containing additional fresh magnesium oxide, the content of magnesium metal and oxide in the dross is recovered and therefore decreases the requirement of fresh magnesium oxide for a given production of magnesium.

A particular advantage in the use of the aluminum dross as a source of the metallic aluminum and modifying agents is the fact that the various ingredients of this dross are intimately blended.

An additional advantage lies in the fact that the aluminum particles present in the dross are of a porous spongy texture. This increases the area of surface contact with the magnesium compound undergoing reduction.

Also the use of the porous granules of aluminum dross including the moderators makes possible the use of reduced quantities or, in some cases, the complete elimination of the fluorspar ordinarily required in retort charges in which ferrosilicon is the sole reducing agent. Thus 1% to 3% or so of fluorspar is ordinarily used in the retort charge using ferrosilicon. This fluorspar is commonly believed in the industry to be a catalyst of the reduction. When the mixture of aluminum with its nitride, carbide, and oxide is used, the fluorspar may be completely eliminated. The catalytic effect of the fluorspar is not required when the aluminum dross provides as little as 10% of the total reducing power of the charge, ferrosilicon supplying the rest of the reducing agent.

An additional advantage in the use of the aluminum with the moderators, say in the form of aluminum dross, is the large range of size of particles that is permissible in the material supplied to the retort for the reduction of magnesium.

The dross may be used in the form of particles as coarse as 4 mesh and may have to advantage the following screen analyses.

Dross #1

| | Percent |
|---|---|
| −4+6 mesh | 3 to 8 |
| −6+8 mesh | 10 to 20 |
| −8+10 mesh | 9 to 15 |
| −10+12 mesh | 20 to 33 |
| −12+20 mesh | 25 to 40 |
| Minus 20 mesh | 1 to 20 |
| Metallic aluminum content | 70 to 81 |

Dross #2

| | Percent |
|---|---|
| +8 mesh | 8 to 10 |
| −8+20 mesh | 80 to 90 |
| −20+40 mesh | 4 to 10 |
| Metallic aluminum content | 50 to 62 |

These screen analyses have been determined using Tyler standard laboratory screens in a Rotap machine for a period of 10 minutes.

In spite of the use of material of such coarseness of average particles, yields of magnesium have been obtained which range from about 72 to 85% calculated on the total reducing agent in the retort. This gain in yield is in addition to the saving in time and less damage to the furnaces.

The invention will be further illustrated by the following specific examples of the practice of it.

There was used an aluminum dross containing 65% of aluminum metal, 19% of aluminum oxide, 4% of aluminum nitride, and about 0.4% of aluminum carbide in addition to 5% of magnesium oxide and sufficient copper oxide, ferric oxide, silicon and other impurities of the dross to make 100% by weight.

This dross was mostly 20 mesh to 8 mesh in size but there was a small percentage of larger granules.

The dross was mixed with finely divided ferrosilicon in proportion to provide reducing power just equal to that of the aluminum dross. This reducing mixture was then blended with calcined dolomite in such proportions that there was a moderate excess of total magnesium oxide over the reducing mixture used.

The charge was then briquetted and heated in a conventional magnesium reduction furnace connected at its vapor outlet to a conventional magnesium condensing chamber.

A run was made at 2160° F. for seven hours under vacuo. The yield of magnesium calculated on the basis of the reducing mixture used was 72.3%.

Another run made at 2100° F. for 9 hours under vacuo gave a yield of 85.1% on the same basis.

In third and fourth runs, the aluminum dross containing the nitride, oxide, and carbide moderators was not used. The dross was replaced by an amount of aluminum equivalent to the aluminum content of the dross of the previous runs. In the runs with aluminum but no moderators at a furnace temperature of 2160° F., the magnesium vapor was released so rapidly that the condenser chamber overheated. The cover plate gasket became damaged and permitted air leakage into the condenser. In both these runs without the moderators, the magnesium, instead of being condensed in a solid state, condensed partly in a liquid condition and was of such a high temperature that much of it later ignited and was converted to oxide before it could be weighed for calculation of the yield.

To make alkaline earth metals other than magnesium, the magnesium oxide in the above described operations is replaced by an equivalent weight of the oxide of the other metal, the production of which is desired, as for instance, by the oxide of calcium, strontium, or barium. The method followed is that described above except that the temperature of reduction is made sufficiently high to reduce and distill the resulting liberated metal under the prevailing vacuum, in accordance with known reduction temperatures and vapor pressures at high temperatures.

It will be understood also that it is intended to cover all changes and modifications of the examples of the invention herein chosen for the purpose of illustration which do not constitute departures from the spirit and scope of the invention.

What I claim is:

1. In making an alkaline earth metal, the method which comprises mixing oxide of the alkaline earth metal to be made with aluminum as reducing agent and a mixture consisting of aluminum nitride, carbide and oxide in the proportion of 0.5 to 10 parts by weight of the nitride, 0.1 to 1 part of the carbide, and 10 to 50 parts of the oxide for 100 parts of total weight of the said mixture and aluminum, heating the whole mixed mass to furnace temperature of at least approximately 2000° F., to cause reduction of the alkaline earth metal oxide to free alkaline earth metal, and distilling in vacuo and condensing the said metal, the mixture of aluminum nitride, carbide, and oxide serving during the heating as a moderator of the activity of the aluminum as reducing agent.

2. The method described in claim 1, the said oxide of the alkaline earth metal being magnesium oxide.

FRANK R. KEMMER.

REFERENCES CITED

The following references are of record in the file of this patent:

UNITED STATES PATENTS

| Number | Name | Date |
|---|---|---|
| 1,379,886 | Waldo | May 31, 1921 |
| 2,402,193 | Willmore | June 18, 1946 |

FOREIGN PATENTS

| Number | Country | Date |
|---|---|---|
| 545,458 | Great Britain | May 27, 1942 |

OTHER REFERENCES

Edwards: The Aluminum Industry. Published by McGraw-Hill Book Co., New York, 1939. Page 330.

W. M. Pierce et al.: American Institute of Mining and Metallurgical Engineering; Technical Publication 1707, New York, 1944. Page 13.